(12) United States Patent
Asnis et al.

(10) Patent No.: US 8,149,851 B2
(45) Date of Patent: Apr. 3, 2012

(54) MEDIATED NETWORK ADDRESS TRANSLATION TRAVERSAL

(75) Inventors: Ilya Asnis, San Jose, CA (US); Vikram Dham, Fremont, CA (US)

(73) Assignee: Sling Media, Inc., Foster City, CA (US)

( * ) Notice: Subject to any disclaimer, the term of this patent is extended or adjusted under 35 U.S.C. 154(b) by 263 days.

(21) Appl. No.: 12/405,039

(22) Filed: Mar. 16, 2009

(65) Prior Publication Data
US 2010/0232439 A1 Sep. 16, 2010

(51) Int. Cl.
H04L 12/28 (2006.01)
H04L 12/56 (2006.01)
(52) U.S. Cl. ........................................ 370/401; 370/255
(58) Field of Classification Search .................. None
See application file for complete search history.

(56) References Cited

U.S. PATENT DOCUMENTS

2004/0139228 A1* 7/2004 Takeda et al. ................. 709/245
2007/0076729 A1* 4/2007 Takeda .......................... 370/401

OTHER PUBLICATIONS

Rosenberg, J. et al., "STUN—Simple Traversal of User Datagram Protocol (UDP) Through Network Address Translators (NATs)", Memo from the Internet Society retrieved from internet site http://tools.ietf.org/html/rfc3489, retrieved on Feb. 10, 2009, Mar. 2003, 32 pages.
Rosenberg, J. et al., "Session Traversal Utilities for NAT (STUN)", Memo retrieved from internet site http://tools.ietf.org/html/rfc5389, retrieved on Feb. 10, 2009, Oct. 2008, 52 pages.
Boulton, C., Ed., "Best Current Practices for NAT Traversal for SIP" Ubiquity Software Corporation, Sipping Working Group Internet-Draft; Internet Engineering Task Force; IETF; CH; vol. sipping; No. 7; Jul. 9, 2007 XP015051703 ISSN: 0000-0004, 58 pages.
Rosenberg, J., "Interactive Connectivity Establishment (ICE): A Protocol for Network Address Translator (NAT) Traversal for Offer/Answer Protocols", Internet Engineering Task Force; IETF; Mmusic Internet-Draft; Oct. 29, 2007; XP015058542, 119 pages.
Extended European Search Report issued by the European Patent Office for application No. 10156429.2-1525, dated Jun. 7, 2010, 8 pages.
European Patent Office "Examination Report" mailed Apr. 15, 2011; European Patent Appln. No. 10 156 429.2-1525.
J. Rosenberg et al. "Traversal using Relays Around NAT (IURN): Relay Extensions to Session Traversal Utilities for NAT (STUN) draft-ietf-behave-turn-13", Feb. 24, 2009.
C. Jennings et al. "Managing Client Initiated connections in the Session Initiation Protocol (SIP) draft-ietf-sip-outbound-16", Oct. 29, 2008.

* cited by examiner

Primary Examiner — Ayaz Sheikh
Assistant Examiner — Sori Aga
(74) Attorney, Agent, or Firm — Ingrassia Fisher & Lorenz, P.C.

(57) ABSTRACT

A method of establishing a connection traversing at least one network address translation (NAT) gateway is presented. In the method, a bind request is sent from a source device to a mediation element via a NAT gateway. A bind response associated with the bind request is received. A connection request is sent to the mediation element. The mediation element causes the connection request to be sent to a destination device. A connection response associated with the connection request is received. A hello message is sent to a predicted destination address. The predicted destination address is based on an address received in the connection response. A data connection is established between the source device and the destination device using the predicted destination address.

21 Claims, 6 Drawing Sheets

MEDIATED NETWORK ADDRESS TRANSLATION TRAVERSAL

BACKGROUND

Network address translation (NAT) rewrites packet headers for the purpose of remapping a given IP address and/or ports. Many systems use network address translation to enable multiple hosts on a private network to access the Internet using a single public IP address. Network address translation obscures an internal networks structure. Traffic sent to and received from the Internet all appears to come from a single device.

Devices behind an NAT gateway may not have end to end connectivity. This may cause problems with some Internet protocols. Typically, incoming packets are prevented from reaching their destination on the internal network by the NAT gateway. Furthermore, NAT may interfere with tunneling protocols such as IPsec because NAT may modify values in the packet which cause integrity checks to fail.

However, NAT has become a popular method to address the limitation on the number of IPv4 addresses that are available. In particular, NAT is an indispensable function used extensively in routers for home and small office Internet connections. A common configuration has a local area network using a designated private IP address range (e.g., 192.1.x.x) connected to the Internet via a single public IP address.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
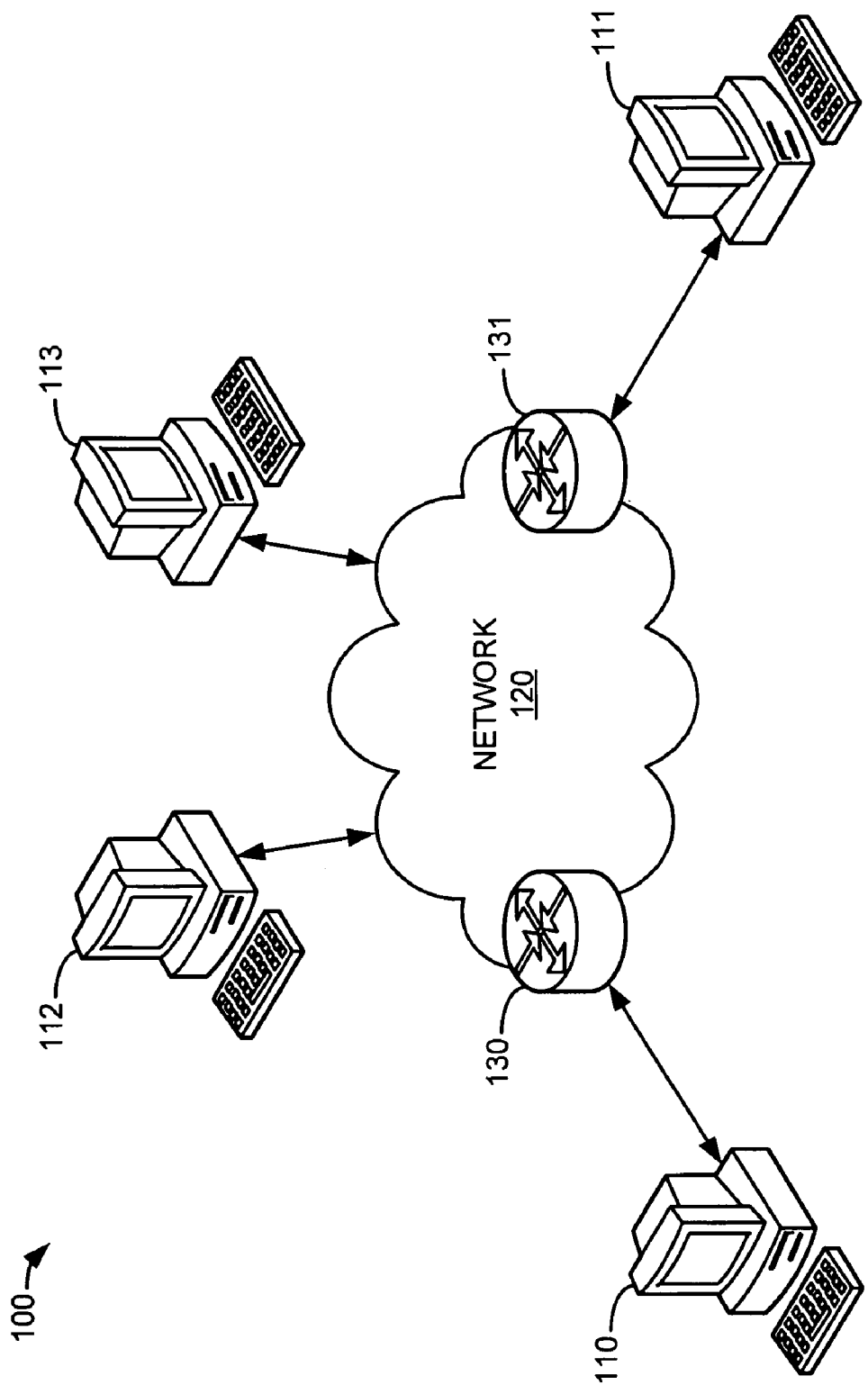
FIG. 1 is an illustration of a mediated network address translation traversal system.

FIG. 1 is an illustration of a mediated network address translation traversal system. In FIG. 1, NAT traversal system 100 comprises source device 110, destination device 111, mediation element 112, message server 113, network 120, NAT gateway 130, and NAT gateway 131. Source device 110 is operatively coupled NAT gateway 130. NAT gateway 130 is operatively coupled to network 120. Destination device 111 is operatively coupled to NAT gateway 131. NAT gateway 131 is operatively coupled to network 120. Mediation element 112 is operatively coupled to network 120. Message server 113 is operatively coupled to network 120.

Network 120 may be any network or collection of networks that couple, link, or otherwise operatively connect NAT gateway 130, NAT gateway 131, mediation element 112, and/or message server 113. Network 120 may include other secondary data networks. In an example, network 120 may include a backhaul network, a local network, a long distance network, a packet network, the Internet, or any combination thereof, as well as other types of networks.

Source device 110 may be any device, system, combination of devices, or other such communication platform capable of communicating with network 120 via NAT gateway 130. Destination device 111 may be any device, system, combination of devices, or other such communication platform capable of communicating with network 120 via NAT gateway 130.

For example, source device 110 or destination device 111 may be, or comprise, for example, a computer, a mobile phone, a wireless phone, a wireless modem, a personal digital assistant (PDA), a voice over internet protocol (VoIP) phone, a voice over packet (VOP) phone, a soft phone, a media device, a network enabled television, a network enabled digital video recorder (DVR), or a Slingbox, as well as other types of devices or systems that can exchange data with network 120 via NAT gateway 130 or NAT gateway 131. Other types of communication platforms are possible.

NAT gateway 130 or NAT gateway 131 may be, or comprise, for example, a NAT configured router, switch, gateway, or computer. NAT gateway 130 or NAT gateway 131 may be configured to implement one or more of full cone NAT, (address) restricted cone NAT, port restricted cone NAT, or symmetric NAT. In addition, source device 110 and destination device 111 may be on the same local network, or may both use the same NAT gateway 130 or 131 to connect with network 120. In this case, (not shown) NAT gateway 130 and NAT gateway 131 would be the same device. Finally, there may be other devices that use NAT gateway 130 or NAT gateway 131 to connect to network 120. However, for the sake of brevity, these are not shown in FIG. 1. Mediation element 112 or message server 113 may be, or comprise, for example, computer systems, servers, or other network connected elements.

Figure 2:
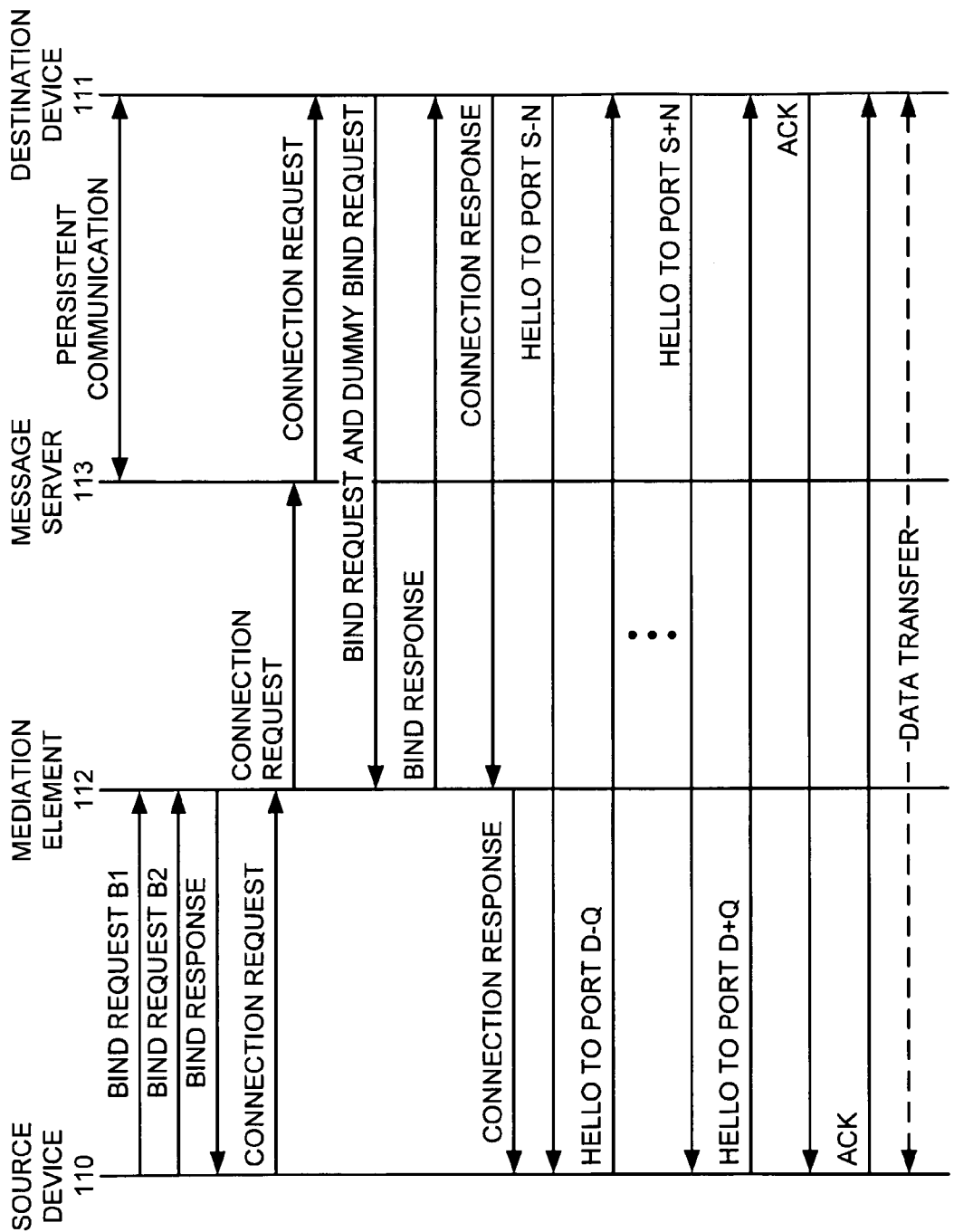
FIG. 2 is a flow diagram of a method of establishing a connection traversing at least one network address translation gateway.

FIG. 2 is a flow diagram of a method of establishing a connection traversing at least one network address translation gateway. In FIG. 2, message server 113 and destination device 111 maintain persistent communication with each other. Thus, message server 113 knows destination device 111's public IP address and port number. A combination address is used herein to refer to the combination of IP address and port number.

Source device 110 sends a bind request to mediation element 112. This first bind request is a dummy bind request which is sent to a port that mediation element 112 is not going to respond to. In FIG. 2, this dummy bind request is shown as going to port B1.

Source device 110 sends a second bind request to mediation element 112. This bind request is shown as being sent to port B2. The second bind request is not a dummy bind request. In response to the second bind request, mediation element 112 sends a bind response to source device 110. This bind response provides source device 110 with the public IP address and port information corresponding to how source device 110 appears to network 120. In other words, the bind response provided by mediation element 112 tells source device 110 its combination network address after possibly having been translated by NAT Gateway 130.

After receiving the bind response from mediation element 112, source device 110 sends a connection request to mediation element 112. This connection request contains the combination address information associated with source device 110. The connection request may also contain other information, such as information about all of source device 110's local IP addresses, WAN address information obtained from a bind response, and, information about mediation element 112's IP address which may be used for mediation. LAN and WAN address information that may be useful in establishing connectivity with destination device 111. Mediation element 112 forwards this connection request to message server 113. The connection request forwarded to message server 113 may also contain information about mediation element 112. Mediation element 112 and message server 113 are able to communicate with each other via network 120. Mediation element 112 and message server 113 typically have static or easily determined public combination addresses.

Message server 113 forwards the connection request to destination device 111. Message server 113 knows the correct combination address of where to send this connection request because it has been in persistent communication with destination device 111.

In response to the connection request, destination device 111 may open a new UDP socket and send a bind request to mediation element 112. This first bind request is a dummy bind request which is sent to a port that mediation element 112 is not going to respond to. Destination device 111 uses information received in the connection request to know where to address this bind request. Destination device 110 sends a second bind request to mediation element 112. The second bind request is not a dummy bind request.

In response to the second bind request, mediation element 112 sends a bind response to destination device 111. This bind response provides destination device 111 with the public IP address and port information corresponding to how destination device 111 appears to network 120. In other words, the bind response provided by mediation element 112 tells destination device 111 its combination network address after possibly having been translated by NAT Gateway 131.

After receiving a bind response from mediation element 112, destination device 111 sends a connection response to mediation element 112. This connection response contains the combination address information associated with destination device 111. The connection response may also contain other information, such as all IP addresses of all of destination device 111's local interfaces, WAN address information associated with destination device 111 that may be useful in establishing connectivity with source device 110, and the WAN IP address of source device 110. This connection response is forwarded to source device 110 by mediation element 112 which may extract source device 110's IP address from the connection response.

After sending the connection response, destination device 111 sends a series of hello messages. These hello messages may be sent to the addresses associated with source device 110 received in the connection request, and to a set of predicted combination addresses based on that address. For example, if a port number received in the connection request is S, destination device 111 may send hello messages to port S+1, S+2 . . . S+N and S−1, S−2, . . . S−N, where N is an arbitrary number such as 10. Other address prediction methods are possible.

For example, by sending multiple bind requests to different mediation elements, the received bind responses may be processed to determine patterns in IP addresses and port numbers. This pattern may be used to communicate more WAN combination addresses to source device 110. These additional combination addresses may be used by source device 110 to send additional hello messages. This may be particularly useful in covering scenarios where a NAT gateway 130-131 is using a pool of IP addresses or port numbers which have a difference that is greater than N.

In another example, other port/IP patterns may be determined and additional hello messages may be sent by source device 110 to combination addresses that fit the pattern. All of these hello messages may be sent by destination device 111 from the same source port number. In addition, destination device 111 may send hello messages to one or more WAN IP addresses. Destination device 111 may send hello messages to one or more LAN addresses the were specified in the connection request.

At the same time, after receiving the connection response, source device 110 sends a series of hello messages. These hello messages may be sent to the address associated with destination device 111 received in the connection response, and to a set of predicted combination addresses based on that address. For example, if the port number received in the connection response is D, source device 110 may send hello messages to port D+1, D+2 . . . D+Q and D−1, D−2 . . . D−Q, where Q is an arbitrary number such as 10. Other address prediction methods, such as those described above with respect to destination device 111, are possible. All of these hello messages may be sent by source device 110 from the same source port number. In addition, source device 110 may send hello messages to one or more WAN IP addresses. Source device 110 may send hello messages to one or more LAN addresses the were specified in the connection response.

When destination device 111 receives a hello message from source device 110, it may obtain a "from source" combination address from the hello message. Destination device 111 may then send an acknowledgment message to this "from source" combination address. Likewise, when source device 110 receives hello message from destination device 111, it may obtain a "from destination" combination address from the hello message. Source device 110 may then send an acknowledgment message to this "from destination" combination address. Accordingly, when destination device 111 has both sent and received an acknowledgment message, it knows that a particular "from source" combination address can be used to send packets for source device 110. Likewise, when source device 110 has both sent and received an acknowledgment message, it knows that a particular "from destination" combination address can be used to send packets tor destination device 111. When source device 110 or destination device 111 know a combination address that can be used to establish communication with the other device, they may stop sending hello messages to predicted port addresses. After both source device 110 and destination device 111 know combination addresses that can be used to establish communication with the other device, these devices establish data connection with each other using the predicted port addresses that were successful in reaching the other device.

Figure 3:
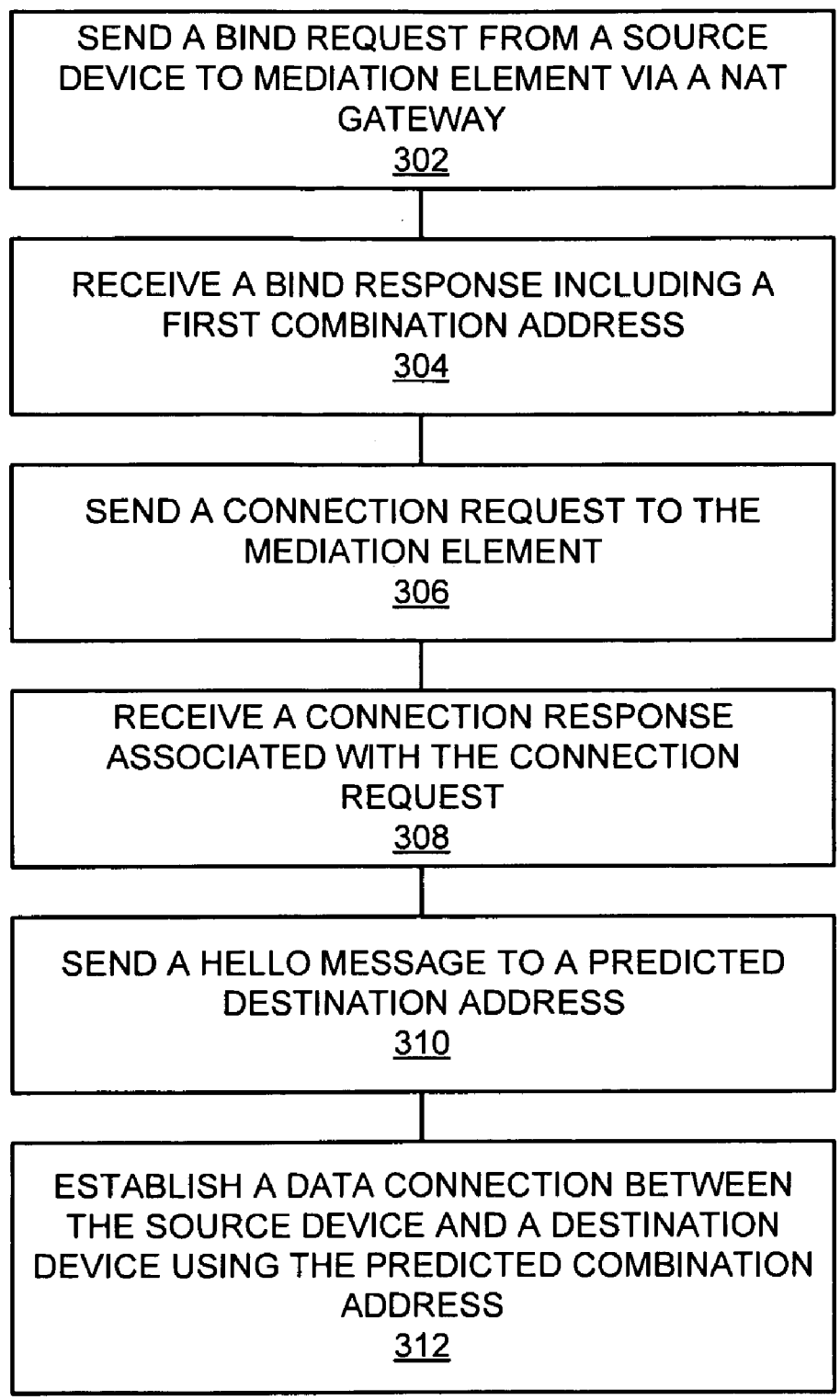
FIG. 3 is a flowchart of a source method of establishing a connection traversing at least one network address translation gateway.

FIG. 3 is a flowchart of a source method of establishing a connection traversing at least one network address translation gateway. The steps illustrated in FIG. 3 may be performed by one or more elements of NAT traversal system 100. A bind request is sent from a source device to a mediation element via an NAT gateway (302). For example, source device 110 may send a bind request to mediation element 112.

A bind response including a first combination address is received (304). For example, source device 110 may receive a bind response from mediation element 112. This bind response may include a combination address associated with source device 110. This combination address may reflect the address that NAT Gateway 130 uses to represent source device 110 to network 120.

A connection request is sent to the mediation element (306). For example, source device 110 may send a connection request to mediation element 112. This connection request may include a combination address associated with source device 110 by NAT Gateway 130. As discussed previously, this connection request made include combination addresses or other information that may be used to help establish connectivity with destination device 111.

A connection response associated with the connection request is received (308). For example, source device 110 may receive a connection response sent by destination device 111. This connection response may have been relayed to source device 110 by mediation element 112. This connection response may include a combination address or other information associated with destination device 111 that may be used to help establish connectivity with destination device 111.

A hello message is sent to a predicted destination address (310). For example, if a port number received in the connection response is D, source device 110 may send hello messages to port D+1, D+2 . . . D+Q, and D−1, D−2 . . . D−Q, where Q is an arbitrary number such as 10. As discussed previously, other address prediction methods are possible. All of these hello messages may be sent by source device 110 from the same source port number.

A data connection is established between the source device and the destination device using the predicted combination address (312). For example, a data connection may be established between source device 110 and destination device 111. This data connection may be established as a result of source device 110 having received an acknowledgment message. This acknowledgement message may have been in response to a hello message source device 110 sent to a predicted combination address.

Figure 4:
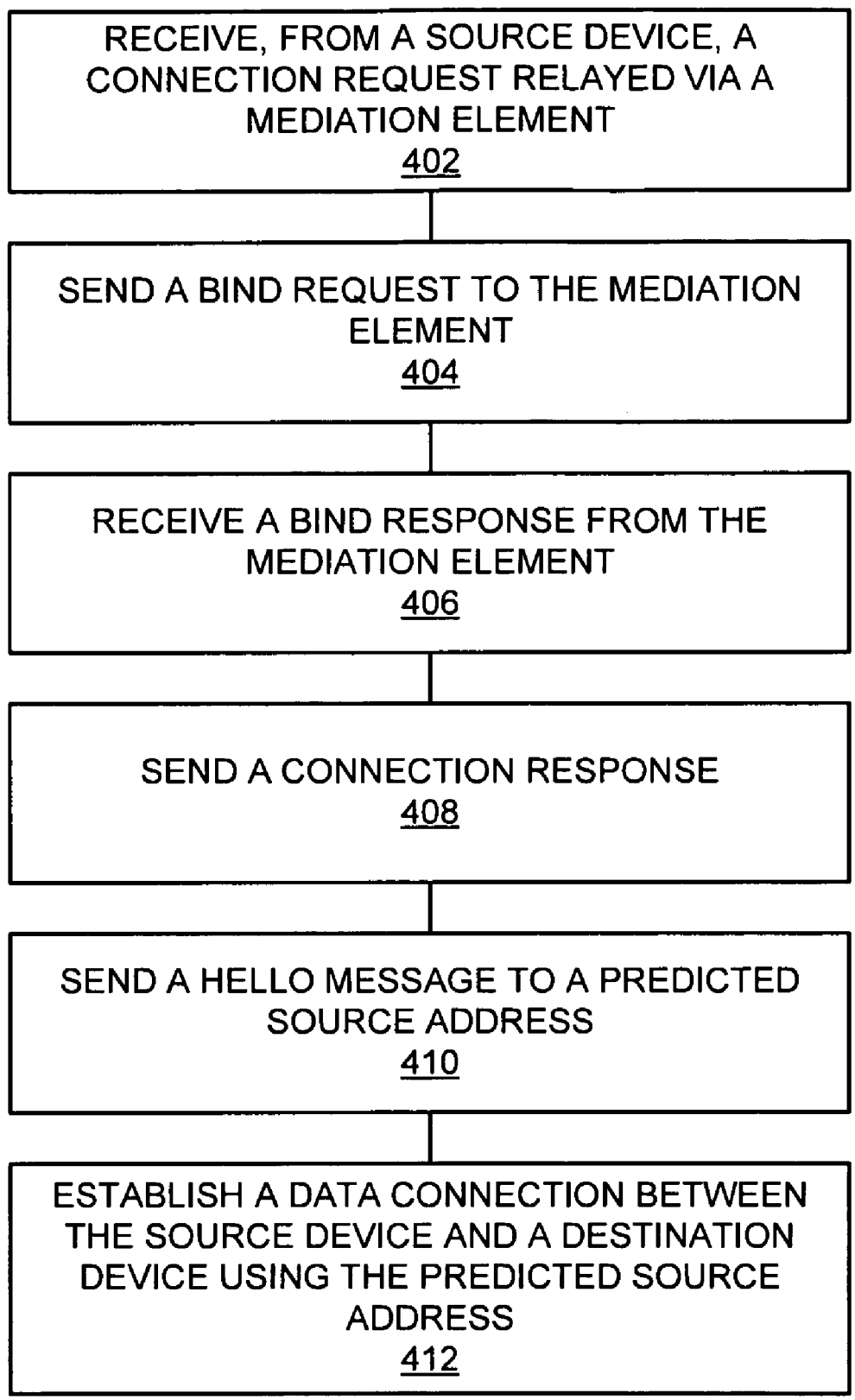
FIG. 4 is a flowchart of a destination method of establishing a connection traversing at least one network address translation gateway.

FIG. 4 is a flowchart of a destination method of establishing a connection traversing at least one network address translation gateway. The steps illustrated in FIG. 4 may be performed by one or more elements of NAT traversal system 100. A connection request relayed via a mediation element is received from a source device (402). For example, destination device 111 may receive a connection request from source device 110. This connection request may have been relayed by mediation element 112. This connection request may include a combination address associated with source device 110 by NAT Gateway 130. This connection request may include a combination address associated with mediation element 112. As discussed previously, this connection request made include other information that may be used to help establish connectivity with destination device 111.

A bind request is sent to the mediation element (404). For example, destination device 111 may send a bind request to mediation element 112. A bind response from the mediation element is received (406). For example, destination device 111 may receive, in response to the bind request sent in block 404, a bind response from mediation element 112. This bind response may include a combination address associated with destination device 111. This combination address may reflect the address that NAT Gateway 131 uses to represent destination device 110 to network 120.

A connection response is sent (408). For example, destination device 111 may send a connection response to mediation element 112. Mediation element 112 may relay this connection response to source device 110. As discussed previously, this connection response may include combination addresses or other information associated with destination device 111 that may be used by source device 110 to help establish connectivity with destination device 111.

A hello messages is sent to a predicted source address (410). For example, if a port number received in the connection request is S, destination device 111 may send hello messages to port S+1, S+2 . . . S+N, and S−1, S−2 . . . S−N where N is an arbitrary number such as 10. As discussed previously, other address prediction methods are possible. All of these hello messages may be sent by destination device 111 from the same source port number.

A data connection between the source device and the destination device is established using a predicted source address (412). For example, a data connection may be established between source device 110 and destination device 111. This data connection may be established as a result of destination device 111 having received an acknowledgment message. This acknowledgment message may have been in response to a hello message destination device 111 sent to a predicted combination address.

Figure 5:
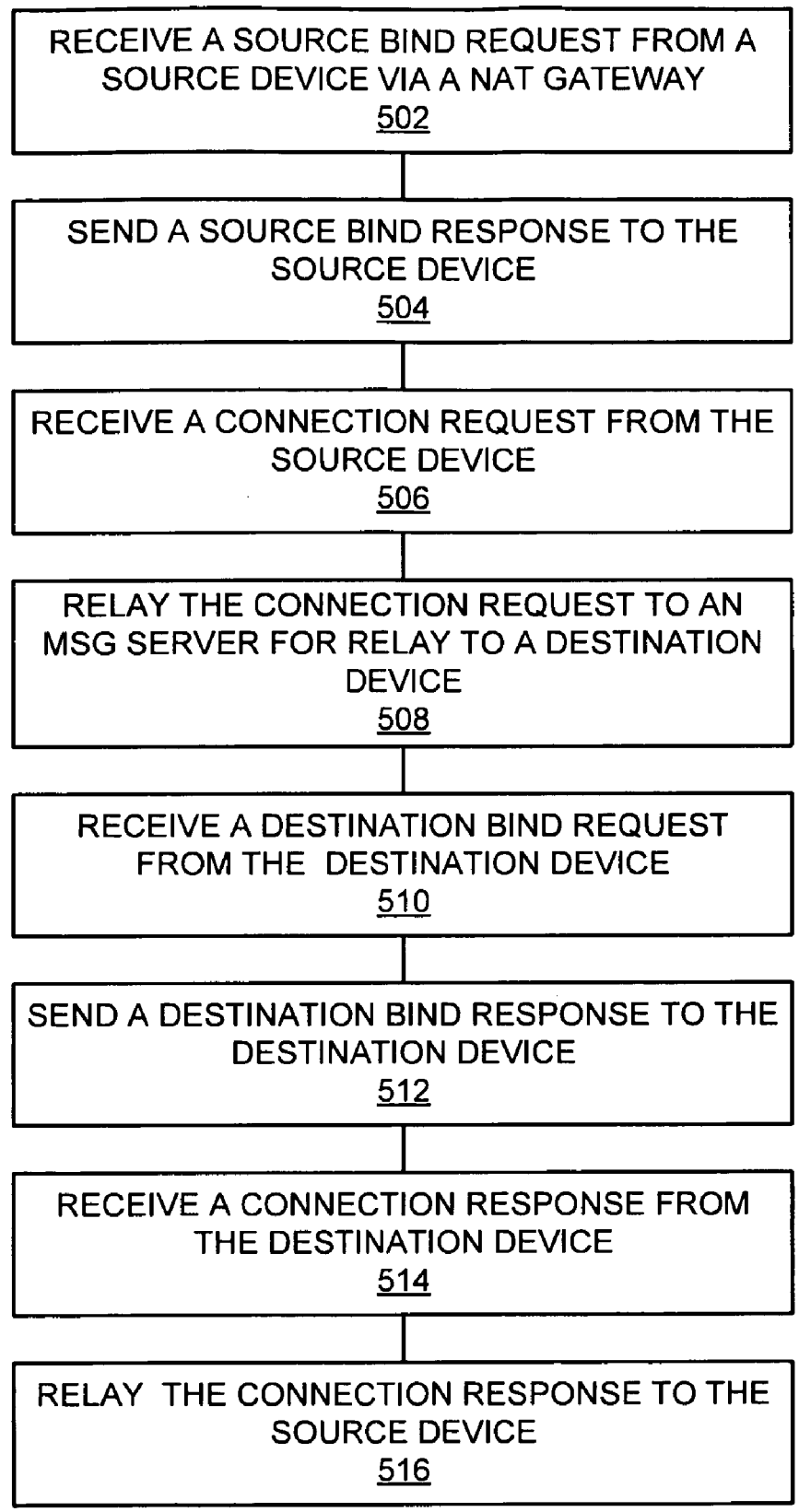
FIG. 5 is a flowchart of a mediation element method of establishing a connection traversing at least one network address translation gateway.

FIG. 5 is a flowchart of a mediation element method of establishing a connection traversing at least one network address translation gateway. The steps illustrated in FIG. 5 may be performed by one or more elements of NAT traversal system 100. A source bind request is received from a source device via an NAT gateway (502). For example, mediation element 112 may receive a bind request from source device 110. This bind request may have been sent via NAT gateway 130.

A source bind response is sent to the source device (504). For example, mediation element 112 may send, to source device 110, a response to the bind request received in block 502. This bind response may include a combination address associated with source device 110. This combination address may reflect the address that NAT Gateway 130 uses to represent source device 110 to network 120. This source bind response may include other combination addresses. For example, this source bind response may include suggested or predicted combination addresses that mediation element 112 determines may be good choices as predicted combination addresses.

A connection request is received from the source device (506). For example, mediation element 112 may receive a connection request from source device 110. This connection request may include a combination address associated with source device 110 by NAT Gateway 130. As discussed previously, this connection request made include other information that may be used to help establish connectivity with destination device 111.

The connection request is relayed to a message server for relay to a destination device (508). For example, mediation element 112 may relay the connection request received in block 506 to message server 113 for relay to the destination device 111. This connection request may include information about mediation element 112, such as a combination address for mediation element 112. A destination bind request is received from the destination device (510). For example, mediation element 112 may receive a bind request from destination device 111. This bind request may have been sent via NAT gateway 131.

A destination bind response is sent to the destination device (512). For example, mediation element 112 may send, to destination device 111, a response to the bind request received in block 510. This bind response may include a combination address associated with destination device 111. This combination address may reflect the address that NAT Gateway 131 uses to represent destination device 111 to network 120. This bind response may include other combination addresses. For example, this destination bind response may include suggested or predicted combination addresses that mediation element 112 determines may be good choices as predicted combination addresses.

A connection response is received from the destination device (514). For example, mediation element 112 may receive a connection response from destination device 111. This connection response may include a combination address or other information associated with destination device 111 that may be used by source device 110 to help establish connectivity with destination device 111. The connection response is relayed to the source device (516). For example, mediation element 112 may relay the connection response to source device 110. As discussed previously, the connection response may also contain combination addresses or other information that may be useful in establishing connectivity with source device 110. The connection response may also contain information about mediation element 112.

The methods, systems, devices, elements, networks, routers, and gateways described above may be implemented with, contain, or be executed by one or more computer systems. The methods described above may also be stored on a computer readable medium. Many of the elements of NAT traversal system 100 may be, comprise, or include computers systems. This includes, but is not limited to: source device 110, destination device 111, mediation element 112, message server 113, network 120, NAT gateway 130, and NAT gateway 131.

Figure 6:
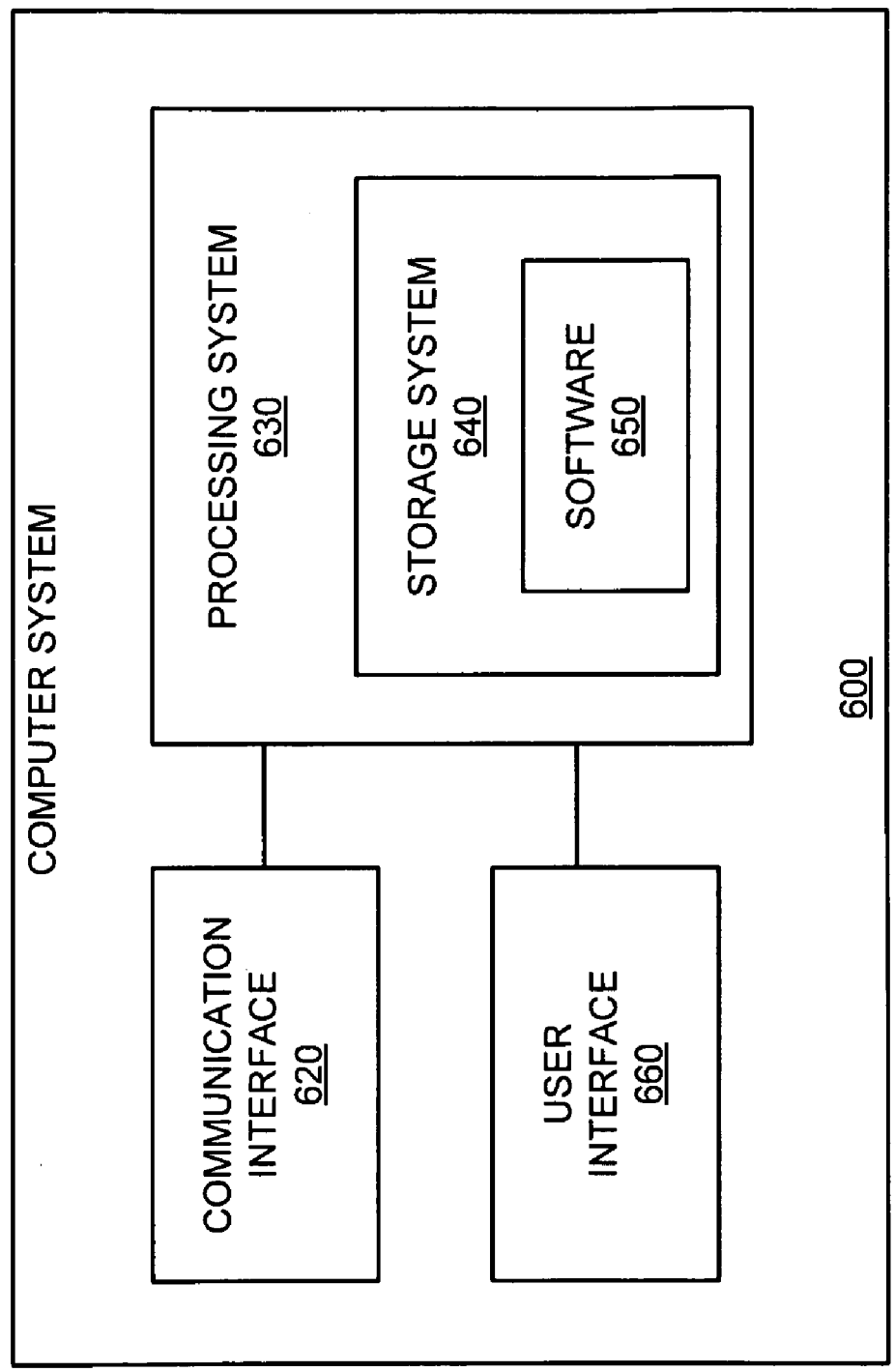
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

While several embodiments of the invention have been discussed herein, other implementations encompassed by the scope of the invention are possible. For example, other algorithms and information may be used to create predicted combination addresses. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method executable by a source device to establish a connection to a destination device traversing at least one network address translation (NAT) gateway on a network, the method comprising:

placing a first request for a first combination address from the source device, wherein the request is transmitted to a mediation element on the network;

receiving a first response associated with the first request from the mediation element, the first response including the first combination address, wherein the first combination address identifies the source device to the mediation element on the network;

sending a second request including the first combination address to the mediation element to thereby cause the first combination address to be sent to the destination device via a message server having a pre-existing connection with the destination device over the network;

receiving a second response associated with the second request at the source device via the network, the second response including a second combination address, the second combination address being associated with the destination device;

sending a first message directly to a predicted destination combination address, the predicted destination combination address being based on the second combination address; and establishing a direct data connection between the source device and the destination device using the predicted destination combination address.

2. The method of claim 1, wherein the data connection is established based on receiving an acknowledgement message that was a result of sending the first message to the predicted destination combination address.

3. The method of claim 1, further comprising:

receiving a second message that was sent to a predicted source combination address, the predicted source combination address being based on the first combination address.

4. The method of claim 1, further comprising:
selecting a plurality of predicted combination addresses using a range of port numbers around a first port number included in the second combination address; and,
sending hello messages to each of each of the predicted combination addresses.

5. The method of claim 1, further comprising:
sending a dummy request to the mediation element.

6. The method of claim 1, wherein the predicted destination combination address is based on a third combination address received from the mediation element.

7. The method of claim 6, wherein establishing a connection to the third combination address does not require traversing the NAT gateway.

8. The method of claim 1, wherein the first request is relayed to the destination device via a message server that is in persistent communication with the destination device.

9. The method of claim 1, further comprising:
sending the first request from the source device to the mediation element via a NAT gateway.

10. A method executable by a destination device to establish a direct connection with a source device traversing at least one network address translation (NAT) gateway on a network, the method comprising:
initially establishing a pre-existing connection from the destination device to a message server;
receiving a first request for a connection to a source device at the destination device, wherein the request for the connection is relayed from a mediation device in communication with the source device to the destination device via the pre-existing connection between the destination device and the message server, and wherein the source device is associated with a first combination address on the network;
sending, in response to the first request, a second request from the destination device to the mediation element to obtain a second combination address associated with the destination device on the network;
receiving a first response from the mediation element at the destination device, the first response including the second combination address;
sending a message to a predicted source combination address of the source device, the predicted source combination address being based on the first combination address of the source device, wherein the message indicates the second combination address to thereby permit the source device to contact the destination device directly via the network; and,
establishing the direct connection between the source device and the destination device using the predicted source combination address.

11. The method of claim 10, wherein the data connection is established based on receiving an acknowledgement message that was a result of sending the message to the predicted source combination address.

12. The method of claim 10, further comprising:
receiving a second message that was sent to a predicted destination combination address, the predicted destination combination address being based on the first combination address.

13. The method of claim 10, further comprising:
selecting a plurality of predicted combination addresses using a range of port numbers around a port number included in the first combination address; and,
sending messages to each of each of the predicted combination addresses.

14. The method of claim 10, wherein the message service is separate from the mediation element.

15. The method of claim 10 wherein the pre-existing connection is a TCP connection.

16. The method of claim 10, wherein the message is relayed to the source device via the mediation element that received a source request.

17. A method of determining addresses for a connection traversing at least one network address translation (NAT) gateway on a network, the method comprising:
receiving a source bind request from a source device via a NAT gateway;
sending a source bind response to the source device, the source bind response including a first combination address associated with the source device on the network;
receiving a connection request from the source device;
in response to the connection request, relaying the connection request to a message server for relaying to a destination device via a pre-established connection between the message server and the destination device;
receiving a destination bind request from the destination device;
sending a destination bind response to the destination device, the destination bind response including a second combination address associated with the destination device on the network;
receiving a connection response from the destination device; and,
relaying the connection response to the source device to thereby allow the source device and the destination device to establish a direct connection via the network.

18. The method of claim 17, wherein the pre-established connection was established from the destination device to the message server prior to the source bind request.

19. The method of claim 17, further comprising:
receiving a dummy bind request from the source device.

20. The method of claim 17, further comprising:
sending a predicted source combination address to the destination device.

21. The method of claim 17, further comprising:
sending a predicted destination combination address to the source device.

* * * * *